US012762707B2

(12) United States Patent
Kimura et al.

(10) Patent No.: US 12,762,707 B2
(45) Date of Patent: Oct. 13, 2026

(54) PROGRAM, IMAGE PROCESSING METHOD, AND IMAGE PROCESSING DEVICE

(71) Applicant: Renesas Electronics Corporation, Tokyo (JP)

(72) Inventors: Motoki Kimura, Tokyo (JP); Kenta Kuramochi, Tokyo (JP); Yuji Obayashi, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 122 days.

(21) Appl. No.: 18/440,275

(22) Filed: Feb. 13, 2024

(65) Prior Publication Data

US 2025/0285282 A1 Sep. 11, 2025

(30) Foreign Application Priority Data

Mar. 17, 2023 (JP) ................................ 2023-043132

(51) Int. Cl.

| | |
|---|---|
| ***G06T 7/11*** | (2017.01) |
| ***G06T 1/60*** | (2006.01) |
| ***G06T 5/20*** | (2006.01) |
| *G06V 10/82* | (2022.01) |

(52) U.S. Cl.

CPC .................. *G06T 7/11* (2017.01); *G06T 1/60* (2013.01); *G06T 5/20* (2013.01); *G06T 2207/20021* (2013.01); *G06V 10/82* (2022.01)

(58) Field of Classification Search

CPC ... G06T 5/20; G06T 7/11; G06T 2207/20021; G06V 10/82

See application file for complete search history.

(56) References Cited

U.S. PATENT DOCUMENTS

| | | | |
|---|---|---|---|
| 8,385,631 | B2 | 2/2013 | Yamamoto et al. |
| 11,012,617 | B2 | 5/2021 | Yamamoto |
| 11,455,781 | B2 | 9/2022 | Cui et al. |

(Continued)

FOREIGN PATENT DOCUMENTS

| | | | |
|---|---|---|---|
| JP | 2008-310524 | A | 12/2008 |
| JP | 2020-5118 | A | 1/2020 |
| JP | 2022-508028 | A | 1/2022 |

OTHER PUBLICATIONS

Notice of Reasons for Refusal received in corresponding Japanese Patent Application No. 2023-043132, dated Aug. 12, 2026.

*Primary Examiner* — Yuzhen Shen

(74) *Attorney, Agent, or Firm* — RIMON P.C.

(57) ABSTRACT

An image processing device according to an embodiment includes: an image division unit dividing input image data into first division image data and second division image data having a predetermined overlap region with the first division image data according to a size of a kernel used for image processing; a reuse data determination unit determining first reuse data reused in performing the image processing to the second division image data among the first division image data; and a memory management unit, in a memory, storing first processed data of a first division image obtained by performing the image processing to the first division image data, in a region other than a region storing the first reuse data, and allocates a region storing the second division image data so as to be adjacent to the region storing the first reuse data.

9 Claims, 8 Drawing Sheets

(56) References Cited

U.S. PATENT DOCUMENTS

| | | | | |
|---|---|---|---|---|
| 2015/0371359 | A1* | 12/2015 | Wu | G06V 10/50 382/279 |
| 2017/0147264 | A1* | 5/2017 | Takabatake | G06F 3/0659 |
| 2024/0273874 | A1* | 8/2024 | Nakamura | G06V 10/7715 |
| 2024/0303040 | A1* | 9/2024 | He | G06F 9/544 |

* cited by examiner

PROGRAM, IMAGE PROCESSING METHOD, AND IMAGE PROCESSING DEVICE

CROSS-REFERENCE TO RELATED APPLICATIONS

The present application claims priority from Japanese Patent Application No. 2023-043132 filed on Mar. 17, 2023, the content of which is hereby incorporated by reference to this application.

BACKGROUND

The present invention relates to a program, an image processing method, and an information processing device.

One of neural networks used in a field of image processing is a CNN (Convolutional Neural Network). For example, a CNN accelerator IP (Intellectual Property) mounted in an in-vehicle SoC (System on Chip) used for driving support systems, autonomous driving systems, and the like reads an input image onto a built-in memory and repeatedly applies processing of convolution operations and activation functions, thereby extracting a feature amount(s) necessary for image recognition from the input image.

There is a disclosed technique listed below.

[Patent Document 1] Japanese Unexamined Patent Application Publication No. 2020-5118

If a size of the input image exceeds a size that can be processed at once by an accelerator, it is necessary to divide the images and process it. For example, Patent Document 1 discloses a technique in which image data after performing a distortion correction processing to a distortion image is stored in the built-in memory and the image data is read from the built-in memory and is subjected to the filter processing and an image reduction processing. In this technique, when reducing capacity of the built-in memory, the distortion images are divided and are processed. Further, when the distortion correction processing is performed after the distortion image is divided, an overlap region can be formed between the divided distortion images by considering that the image will become smaller after the filter processing.

SUMMARY

As mentioned above, when performing the filter processing that uses pixels surrounding a target pixel for calculations including convolution operations, the output image becomes smaller than an input image and as the processing is repeated, the final output image becomes smaller. In order that the final output image obtained by dividing the image and repeating the processing becomes the same as an image obtained by performing the processing without dividing the image, a pixel(s) prior to a division boundary of the image must extra be processed only the number of the repeated processes. For this reason, overhead occurs in loading to the built-in memory and in performing the arithmetic processing, thereby reducing processing efficiency.

Other problems and novel features will be apparent from the description of the present specification and the accompanying drawings.

A non-transitory computer readable medium according to the present disclosure that stores a program causing a computer to perform an image processing method that include: dividing input image data into a plurality of pieces of division image data including first division image data and second division image data having a predetermined overlap region with the first division image data according to a size of a kernel used for an image processing; determining first reuse data to be reused in performing the image processing to the second division image data among the first division image data; and in a memory, storing first processed data of a first division image, which is obtained by performing the image processing to the first division image data, in a region other than a region storing the first reuse data, and allocating a region storing the second division image data so as to be adjacent to the region storing the first reuse data.

An image processing method performed by a computer according to the present disclosure that includes: dividing input image data into a plurality of pieces of division image data including first division image data and second division image data having a predetermined overlap region with the first division image data according to a size of a kernel used for an image processing; determining first reuse data to be reused in performing the image processing to the second division image data among the first division image data; and in the memory, storing first processed data of a first division image, which is obtained by performing the image processing to the first division image data, in a region other than a region storing the first reuse data, and allocating a region storing the second division image data so as to be adjacent to the region storing the first reuse data.

An image processing device according to the present disclosure that includes: an image division unit dividing input image data into a plurality of pieces of division image data including first division image data and second division image data having a predetermined overlap region with the first division image data according to a size of a kernel used for an image processing; a reuse data determination unit determining first reuse data to be reused in performing the image processing to the second division image data among the first division image data; and a memory management unit, in a memory, storing first processed data of a first division image, which is obtained by performing the image processing to the first division image data, in a region other than a region storing the first reuse data, and allocating a region storing the second division image data so as to be adjacent to the region storing the first reuse data.

The present disclosure can provide a program, an image processing method, and an image processing device that can suppress a decrease in efficiency in performing the filter processing by dividing the image.

DETAILED DESCRIPTION

Figure 1:
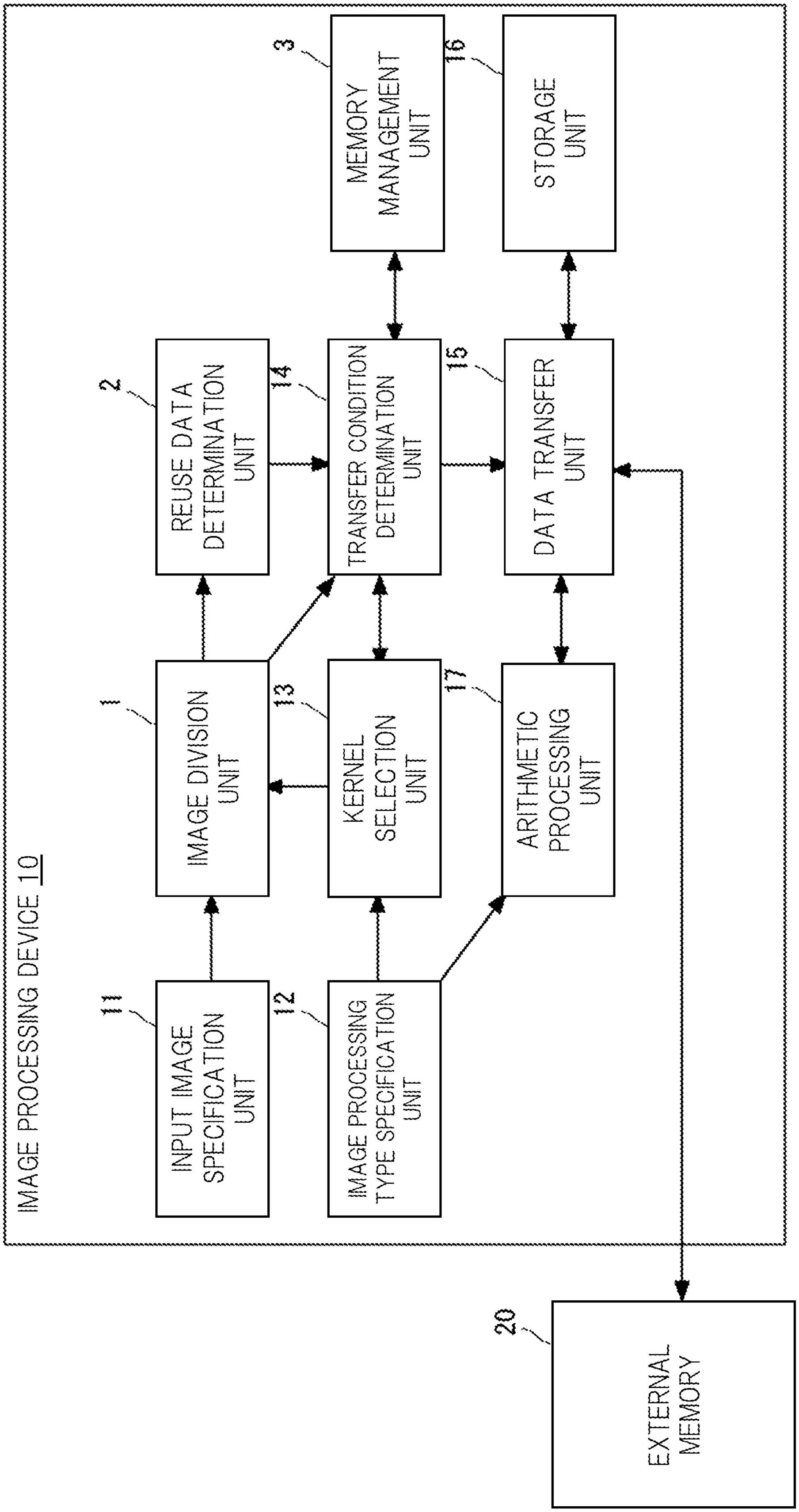
FIG. 1 is a block diagram showing a configuration example of an image processing device according to a first embodiment.

Embodiments of the present disclosure will be described below with reference to the drawings. Note that since the drawings are simplified, the technical scope of the present disclosure should not be interpreted narrowly based on the descriptions in the drawings. Further, in each drawing, the same elements are given the same reference numerals, and overlapping descriptions thereof will be omitted. It should be noted that for convenience of explanation, the drawings are not drawn to actual scale.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including operation steps and the like) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value (including number of pieces, values, amount, range, and the like) and the range described above.

An image processing device according to an embodiment relates, as one example, to an image recognition accelerator that performs an image recognition processing by using a convolutional neural network (CNN). First, CNN will be explained. A CNN is a feedforward neural network for processing data with a grid type topology such as image data. The CNN has a convolution processing layer that applies a filter to the image data to be processed and extracts feature points of the image to be processed, and a fully connected layer that converts the image data in a two-dimensional array to one-dimensional array data and determines what the image data to be processed indicates.

The convolution processing layer has a structure in which two types of layers, convolution layers and pooling layers, are stacked alternately. Input image data to the convolutional layer can be represented by an H×W×C tensor. Here, H, W, and C indicate a height, a width, and the number of channels of the input image data, respectively. In the convolution layer, an arithmetic processing using a filter called a kernel is performed to such input image data, and intermediate image data called a feature map is generated. The generated intermediate image data is sent to subsequent layers, and the arithmetic processing further is performed thereto.

Figure 11:
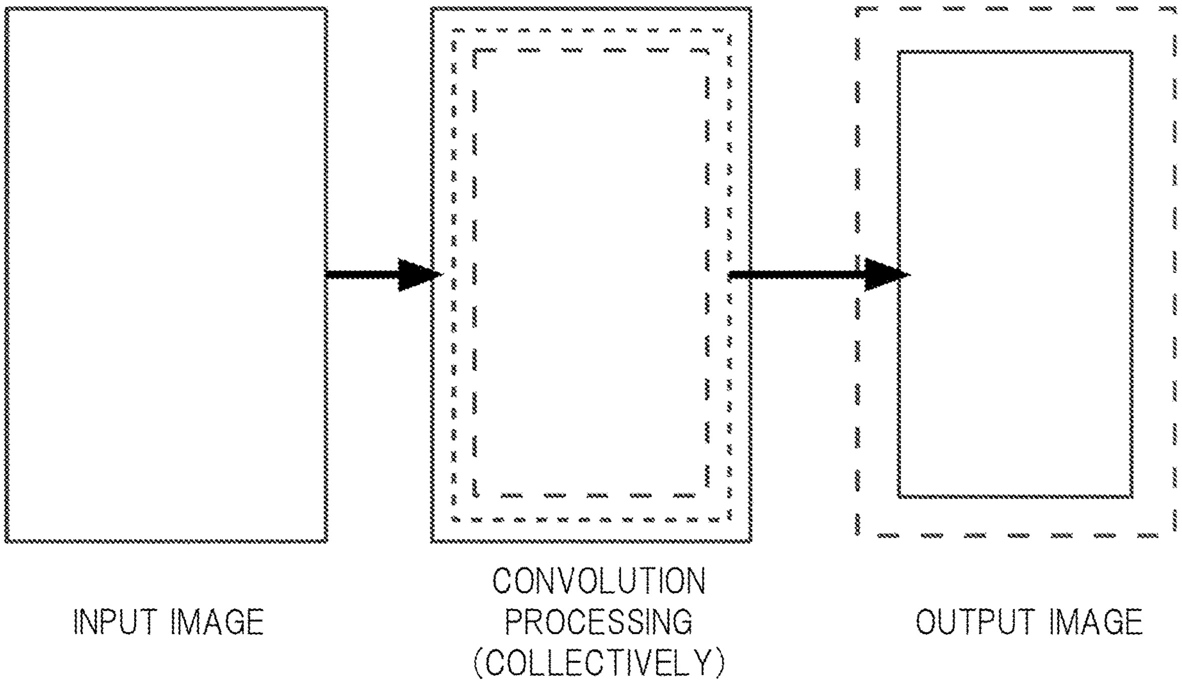
FIG. 11 is a diagram for explaining a comparative example.

As mentioned above, when performing the convolution processing, the output image is smaller than the input image and each time the processing is repeated, the final output image becomes smaller. FIG. 11 shows a size of the output image when the convolution processing is performed twice without dividing the input image. For example, in a case where the kernel size is 3×3, each time one convolution processing is performed, the output image decreases by one line each from top, bottom, right, and left directions of the input image, that is, by two lines each in vertical and horizontal directions. Therefore, when the convolution processing is performed twice, a length and a width of the input image are reduced by four lines each.

When the image is divided and processed, in order to obtain an output image of the same size as the output image in FIG. 11, an overlap region is required between the divided images by considering that the image will become smaller after the convolution processing. That is, the pixels beyond the image division boundary must extra be processed only the number of the convolution processing to be repeatedly performed.

For example, cases where the input image has a size of 100×100 and the convolution processing is performed five times by using a 3×3 kernel are considered. In this case, first, a 100×100 input image is read into the built-in memory. If the image is not divided, a first intermediate image becomes 98×98, a second intermediate image becomes 96×96, a third intermediate image becomes 94×94, a fourth intermediate image becomes 92×92, and a final output image becomes 90×90. In this case, a total of 10000 pixels are loaded into the built-in memory, and the number of the convolution operations becomes 44220.

In contrast, when the image is divided into two, data of 100×55 as a first input image and 100×55 as a second input image are read into the built-in memory. For each of the first and second input images, a first intermediate image becomes 98×53, a second intermediate image becomes 96×51, a third intermediate image becomes 94×49, and a fourth intermediate image becomes 92×47, and a final output image becomes 90×90 which is a combination of two pieces of 90×45 data. In this case, a total of 11000 pixels are loaded into the built-in memory, which is an increase of 10% in comparison with the case where the input image is not divided. Further, the number of convolution operations at this time is 46140 times, which is an increase of about 4.3% in comparison with the case where the input image is not divided.

In this way, if the number of loads to the built-in memory and the number of arithmetic operations increase and the processing efficiency decreases, this causes an increase in power consumption. This problem is not limited to the convolution processing but also applies to other filter processes using the pixels surrounding the target pixel for an averaging processing and the like similarly. Therefore, the present inventors devised the following configuration in order to reduce the number of times of image data read and the number of pieces of arithmetic processing.

First Embodiment

Figure 2:
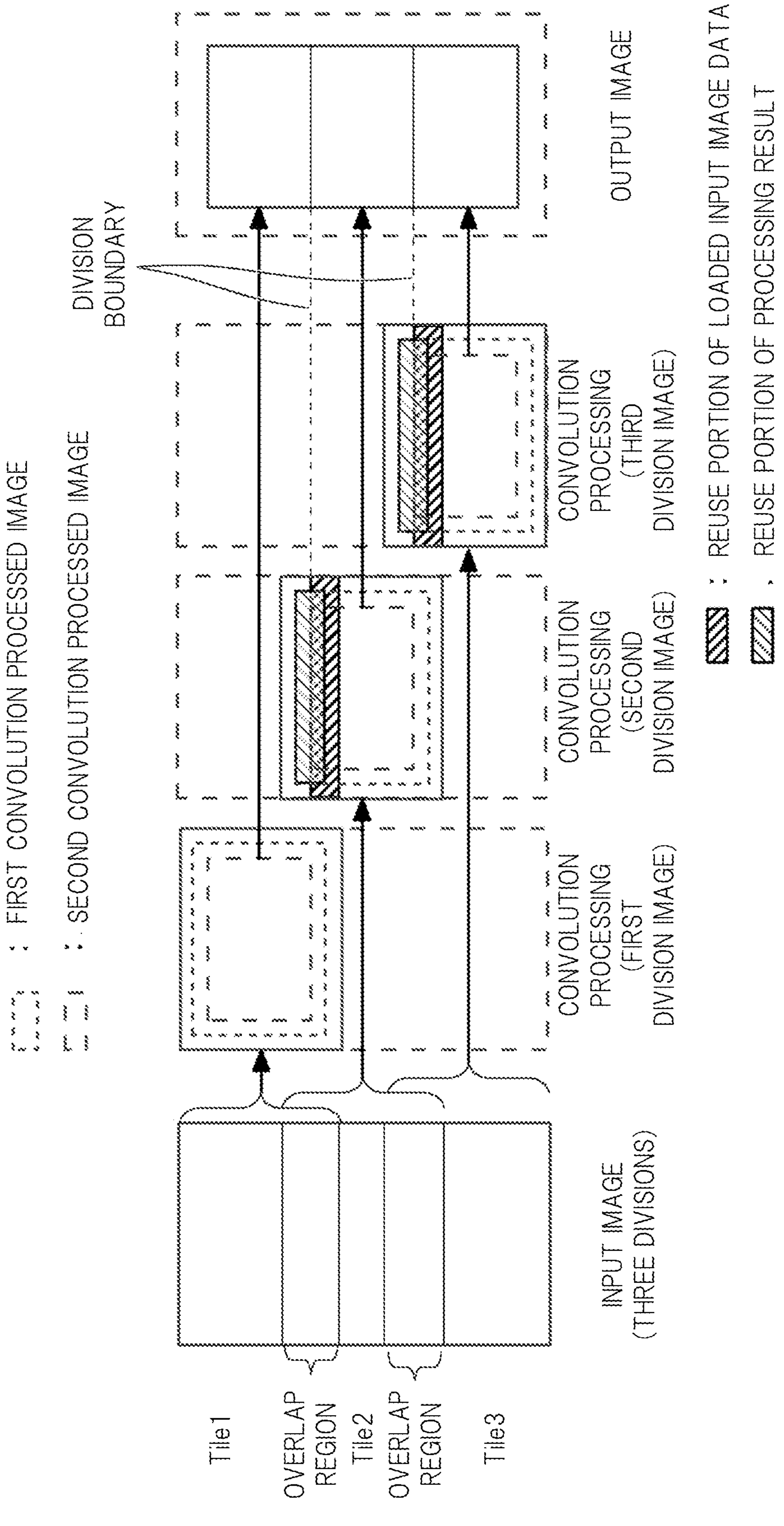
FIG. 2 is a diagram for explaining one example of an image processing method according to the first embodiment.

An image processing device 10 according to a first embodiment will be described with reference to FIGS. 1 and 2. FIG. 1 is a block diagram showing a configuration example of an image processing device according to the first embodiment. FIG. 2 is a diagram for explaining one example of an image processing method according to the first embodiment.

As shown in FIG. 1, the image processing device 10 performs a convolution processing, in which a predetermined kernel is applied to an input image, among processes related to a convolution neural network. The image processing device 10 divides input image data to be processed inputted from an outside into a plurality of pieces of division image data and processes them. The image processing device 10 includes at least an image division unit 1, a reuse data determination unit 2, and a memory management unit 3.

Specifically, in addition to these components, the image processing device 10 includes an input image specification unit 11, an image processing type specification unit 12, a kernel selection unit 13, a transfer condition determination unit 14, a data transfer unit 15, and a storage unit 16, and an arithmetic processing unit 17. Note that in an example shown in FIG. 1, an external memory 20 is shown as one of external components used by the image processing device 10. The external memory 20 is, for example, a nonvolatile memory such as a flash memory, or a volatile memory such as a DDR-DRAM (Double Data Rate-Dynamic Random Access Memory). The external memory 20 stores the input images and the output images.

The input image specification unit 11 specifies a size (H, W) of input image data to be processed, a head address, and a data format, and transmits specified information to an image division unit 1. The data format is a data record method, and is sometimes referred also to as a file format. The data format of the input image data includes, for example, JPG (Joint Photographic Experts Group), GIF (Graphics Interchange Format), PNG (Portable Network Graphics), and the like.

The image processing type specification unit 12 specifies a type of image processing applied to the input image data to be processed, and sends the specified information to the kernel selection unit 13 and the arithmetic processing unit 17. Here, it is assumed that the image processing type specification unit 12 has specified, as an example of the type of image processing, a processing in which the convolution processing using a 3×3 kernel is performed twice. Note that various specifications by the input image specification unit 11 and the image processing type specification unit 12 may be inputted from the outside or may be set in advance.

The kernel selection unit 13 selects a kernel size used for calculation according to the type of image processing specified by the image processing type specification unit 12. For example, the kernel selection unit 13 can select a suitable convolution kernel size for performing feature detection. Here, a 3×3 kernel is selected to perform the convolution processing.

The image division unit 1 divides input image data into a plurality of pieces of division image data including adjacent first division image data and second division image data. The image division unit 1 can divide the input image data based on, for example, the size of the built-in memory storing the input image data and/or limitations related to hardware of an upper limit and the like of the number of data capable of being processed once by the arithmetic processing unit 17 that performs the convolution processing, which will be explained later. Note that a division method of the input image data may be determined based on not only one of these conditions but also a combination of a plurality of conditions.

Additionally, the size of the kernel affects how the input image data is divided, but the size of the kernel is very small in comparison with the size of the input image. For this reason, the kernel size may be used to determine the fine division methods such as adjustment of the number of pixels of boundary portions between the plurality of pieces of division image data and calculation of reuse data described later after determining the large division method of the input image data based on the size of the built-in memory, processing capacity of the arithmetic processing unit 17, and the like.

As shown in FIG. 2, here, an example, in which the input image is divided into three according to the upper limit of the image size capable of being stored in the storage unit 16, will be described. It assumed that the input image divided into three is a first division image, a second division image, and a third division image, respectively.

As mentioned above, when the image is divided and processed, an overlap region is required between the divided images by considering that the image will become smaller after the convolution processing. Therefore, the overlap regions between the first division image and the second division image and between the second division image and the third division image are provided depending on the size of the kernel used in the convolution processing and the number of pieces of convolution processing. As in the first embodiment, when the input image is divided into three and the convolution processing is performed twice by using a 3×3 kernel, it is necessary to provide overlap regions of two lines between the first division region and the second division region and between the second division region and the third division region, respectively.

In this case, between the data loaded into the built-in memory in performing the first convolution processing to the first division image and the data loaded in performing the first convolution processing to the second division image, there is a load overhead portion for two lines that will be loaded redundantly. In addition, some of the data after performing the first convolution processing to the first division image overlap with the data after performing the first convolution processing to the second division image, so there is a calculation overhead portion. These load overhead portion and calculation overhead portion similarly also exist between the second division image and the third division image. In this embodiment, the following processing is performed to reduce these load overhead portion and calculation overhead portion.

The image division unit 1 calculates the size of each piece of division image data based on the division method of the input image determined according to the size of the input image data and the upper limit of the image size capable of being stored in the storage unit 16, and can determine the data to be read from the external memory.

The reuse data determination unit 2 determines first reuse data to be reused from among the first division image data in performing the image processing to the second division image data after performing the image processing to the first division image data. The reuse data determination unit 2 can calculate a size of reuse data to be reused from among the respective pieces of division image data based on the division method of the input image and the size of each division image.

The size of the reuse data can be determined by considering the region (overhead portion) overlapped by the load of the data and the operations as described in FIG. 2.

The size of the reuse data is determined according to a position relationship between a note pixel and peripheral pixels used for processing the note pixel, in other words, according to the kernel size. For example, if the kernel size used in the convolution processing is 3×3, the size of the reuse data can be set at two lines from a bottom of the division boundary. Note that, as shown in FIG. 2, the division boundary means a boundary between the processed images of the respective division images in the final output image.

The memory management unit 3 allocates, to the built-in memory described later, a region for storing the second division image data so as to be adjacent to a region storing the first reuse data of the first division image data. The memory management unit 3 can return a head address of the region allocated on the storage unit 16 in response to a request from the transfer condition determining unit 14.

The transfer condition determination unit 14 determines conditions regarding data transfer between the external memory 20 and the storage unit 16 and between the storage unit 16 and the arithmetic processing unit 17. Specifically, the transfer condition determination unit 14 refers to the size of each division image data or the size of the reuse data, and determines transfer conditions so that each piece of data is stored in the region of the storage unit 16 allocated by the memory management unit 3.

The data transfer unit 15 executes the data transfer between the external memory 20 and the storage unit 16 and between the storage unit 16 and the arithmetic processing unit 17 based on the transfer conditions sent from the transfer condition determination unit 14. The arithmetic processing unit 17 performs arithmetic processing necessary for the image processing specified by the image processing type specification unit 12. Here, the arithmetic processing unit 17 can perform the convolution processing using the 3×3 kernel described above.

The storage unit 16 is a built-in memory that temporarily stores the above-described division image data and the processed data obtained by performing the convolution processing to the division image data. The storage unit 16 can be configured with a volatile memory such as a SPAM (Static Random Access Memory).

The image processing device 10 includes a processor and a memory as components not shown. The memory stores a program that causes a computer to perform each processing of the image processing method according to the first embodiment. The processor reads a program from the memory and executes the program. This makes it possible for the processor to realize each function shown in FIG. 1 including the image division unit 1, the reuse data determination unit 2, and the memory management unit 3.

When performing the fixed operation a huge number of times like the above-mentioned convolution processing, it is preferable to process the specific operation like the accelerator in a manner of hardware. That is, each component of the image processing device 10 may be realized by dedicated hardware. This makes it possible to shorten calculation time. Further, a part or all of each component of each device may be realized by a general-purpose or dedicated circuitry, the processor, and the like, or a combination thereof. These may be configured by a single chip or a plurality of chips connected via a bus(s). The part or all of each component of each device may be realized by a combination of the circuitries and the like described above and a program. Further, as the processor, a CPU (Central Processing Unit), a GPU (Graphics Processing Unit), an FPGA (Field-Programmable Gate Array), a quantum processor (quantum computer control chip), and the like may be used.

Further, in the case where the part or all of each component of the image processing device 10 is realized by the plurality of devices, circuitries, and the like, the plurality of devices, circuitries, and the like may be centrally arranged or dispersed and arranged. The devices, circuitries, and the like that realize each component may be realized as a client server system, a cloud computing system, or the like and as a form in which each is connected via a communication network. Furthermore, the functions of the image processing device 10 may be provided in a SaaS (Software as a Service) format.

Next, the operation of the image processing device 10 when dividing the input image and repeatedly performing the convolution processing will be described. FIGS. 3 to 8 each show a state in which the image data related to each processing is stored in the storage unit 16 (built-in memory) in a flow of the image processing method shown in FIG. 2. Here, as one example, the following case is supposed: the size of the input image data is 100×148, the input image is divided into three and the convolution processing is performed twice, and the size of the final output image is 96×144. Furthermore, it is assumed that the storage unit 16 has, as one example, a two-dimensional storage region of 64 lines with a width of 128 pixels, and is capable of storing the data in a wrap-around format.

In FIGS. 3 to 8, an address in the x direction increases as it moves rightward, and an address in the y direction increases as it moves downward. In the following, a data storage position is indicated by (x, y) coordinates. Note that a format of the storage region of the storage unit 16 is not limited to this. For example, the storage unit 16 may have a one-dimensional storage region.

First, the input image specification unit 11 specifies the size, head address, and the data format of the input image data, and the image processing type specification unit 12 specifies the type of image processing to be performed. As described above, here, it is assumed that the processing of performing the convolution processing using the 3×3 kernel twice is specified. Based on this, the kernel selection unit 13 selects a kernel size of 3×3.

Then, the image division unit 1 determines whether the input image data can be stored in the storage unit 16. When the image division unit 1 determines that the division of the input image data is necessary, it divides the input image into three, that is, first to third division image data, as shown in FIG. 2. In FIG. 2, from a top of the input image, a first division image is set as Tile1, a second division image is set as Tile2, and a third division image is set as Tile3. Hereinafter, the first division image data is set as Tile1 data, the second division image data is set as Tile2 data, and the third division image data is set as Tile3 data.

Here, it is assumed that all of Tile1 to Tile3 are divided into the same size (100×52). However, the sizes of the plurality of division images do not necessarily have the same size. For example, only one of the plurality of division images may be smaller or larger than the other division images, or each of the plurality of division images may have a different size.

By performing the first convolution processing, each Tile becomes 98×50 in size from 100×52. Further, by performing the second convolution processing, each Tile becomes 96×48 in size from 98×50. From this, the reuse data determination unit 2 determines a size of 100×2 as the first reuse data and a size of 98×2 as the second reuse data.

Tile 1 Processing

After the reuse data determination unit 2 determines the size of each piece of reuse data, subsequent processes are performed. First, in order to read the Tile 1 data from the external memory 20 into the storage unit 16, the memory management unit 3 allocates a region in the storage unit 16 for storing the Tile 1 data to be processed. Since there is no allocated region in the storage unit 16 before processing the Tile 1, the memory management unit 3 allocates, as a storage destination for the Tile 1 data, a region of 100×52 pixels from a head (0, 0) of the storage unit 16.

Furthermore, the memory management unit 3 marks, as the Tile 1 first reuse data, data for a last 100×2 pixels. That is, the memory management unit 3 sets, as the Tile 1 first reuse data, the data stored in regions of (0, 50) to (99, 51) of the storage unit 16. The transfer condition determination unit 14 determines a transfer condition(s) so that the Tile 1 data is stored in the region of the storage unit 16 allocated by the memory management unit 3.

Figure 3:
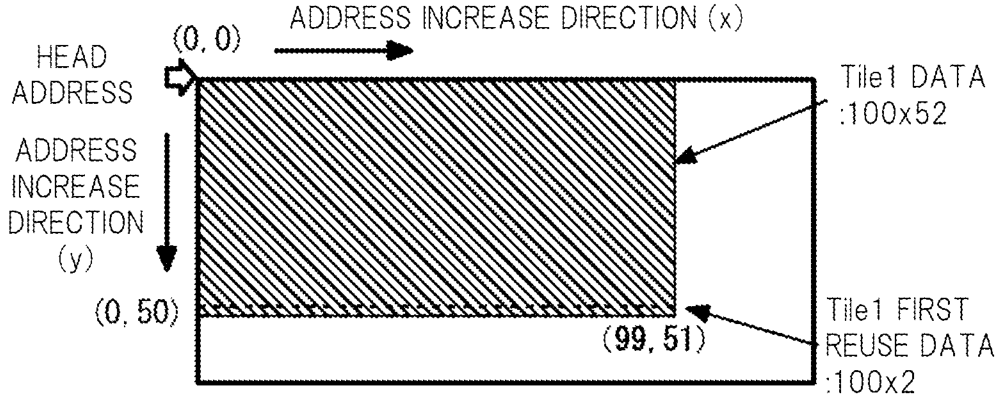
FIG. 3 is a diagram showing a state in which a first division image obtained by dividing an input image into three is loaded into a storage unit.

Based on this transfer condition, the data transfer unit 15 reads the Tile1 data from the external memory 20 and stores it in the allocated region on the storage unit 16. FIG. 3 shows a state in which the Tile 1 data is loaded into the storage unit 16. This state is called state (A). In state (A), the Tile 1 first reuse data is indicated by a broken line frame. The Tile 1 first reuse data corresponds to a reuse portion of the input image data loaded from the external memory 20.

Then, the arithmetic processing unit 17 reads the Tile1 data from the storage unit 16 by using the data transfer unit 15, performs an operation(s) necessary for the first convolution processing using the 3×3 kernel, and generates Tile1 first processed data. The memory management unit 3 allocates a region for storing the Tile 1 first processed data. At this time, if the Tile 1 first processed data is stored in the same position as the Tile 1 data ((1, 1) to (98, 50)), Tile 1 first reuse data stored in (0, 50) to (99, 51) 1 is overwritten.

Therefore, the Tile 1 first processed data is stored, in the storage unit 16, in a region other than the region for storing the Tile 1 first reuse data. This makes it possible to prevent the Tile 1 first reuse data from disappearing. At this time, it is preferable to overwrite and store at least a part of the Tile 1 first processed data the region, in which the Tile 1 data is stored. This makes it possible to reduce the storage capacity of the storage unit 16

Figure 4:
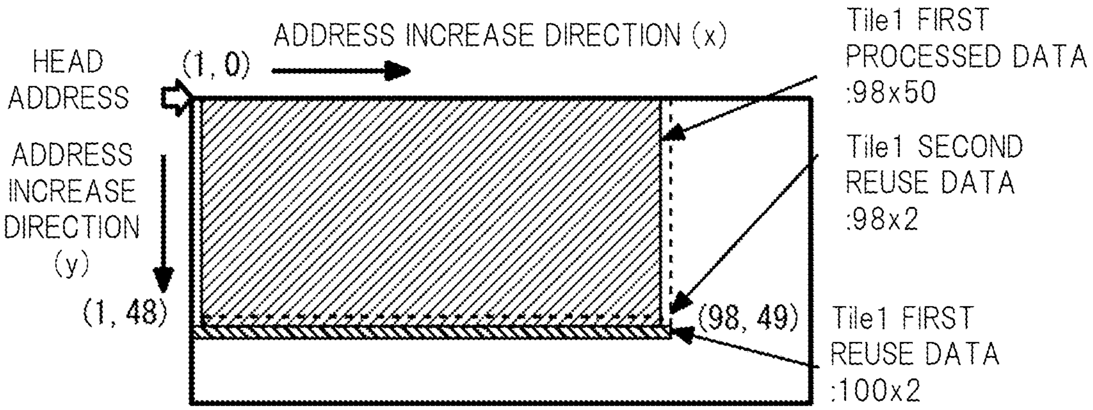
FIG. 4 is a diagram showing a state in which first processed data obtained by performing a first convolution operation to the first division image is stored in the storage unit.

FIG. 4 shows a state in which the Tile 1 first processed data is stored in the storage unit 16. This state is called state (B). As shown in FIG. 4, the Tile 1 first processed data can be stored in, for example, the region of (1, 0) to (98, 49) shifted by one line upward in the y direction from the same position ((1, 1) to (98, 50)) as a position of the Tile 1 data before processing of the Tile 1 first processed data. In state (B), Tile 1 second reuse data is indicated by a broken line frame. The Tile 1 second reuse data corresponds to a reuse portion of a processing result obtained by performing the first convolution processing.

Furthermore, the memory management unit 3 marks, as the Tile 1 second reuse data, the data for last 98×2 pixels of the Tile 1 first processed data. That is, the memory management unit 3 sets, as Tile 1 second reuse data, the data stored in the regions (1, 48) to (98, 49) of the storage unit 16.

The transfer condition determination unit 14 determines transfer conditions so that the Tile1 first processed data is stored in the region of the storage unit 16 allocated by the memory management unit 3. The data transfer unit 15 stores the Tile 1 first processed data in the allocated region on the storage unit 16 based on this transfer condition.

Thereafter, the arithmetic processing unit 17 uses the data transfer unit 15 to read the Tile1 first processed data from the storage unit 16, performs an operation(s) necessary for the second convolution processing using the 3×3 kernel, and generate Tile1 second processed data. The memory management unit 3 allocates a region for storing the Tile 1 second processed data in the storage unit 16. Similarly to the above, if the Tile 1 second processed data is stored at the same position as the Tile 1 first processed data, the Tile 1 second reused data is overwritten.

Therefore, the Tile 1 second processed data is stored, in the storage unit 16, a region other than the region in which the Tile 1 first reuse data and the Tile 1 second reuse data are stored. Further, it is preferable that at least a part of the Tile 1 second processed data is overwritten ad stored in the region in which the Tile 1 first processed data is stored. This makes it possible to reduce the storage capacity of the storage unit.

The transfer condition determination unit 14 determines a transfer condition(s) so that the Tile 1 second processed data is stored in the region of the storage unit 16 allocated by the memory management unit 3. The data transfer unit 15 stores the Tile 1 second processed data in the region allocated on the storage unit 16 based on this transfer condition based on this transfer condition.

Figure 5:
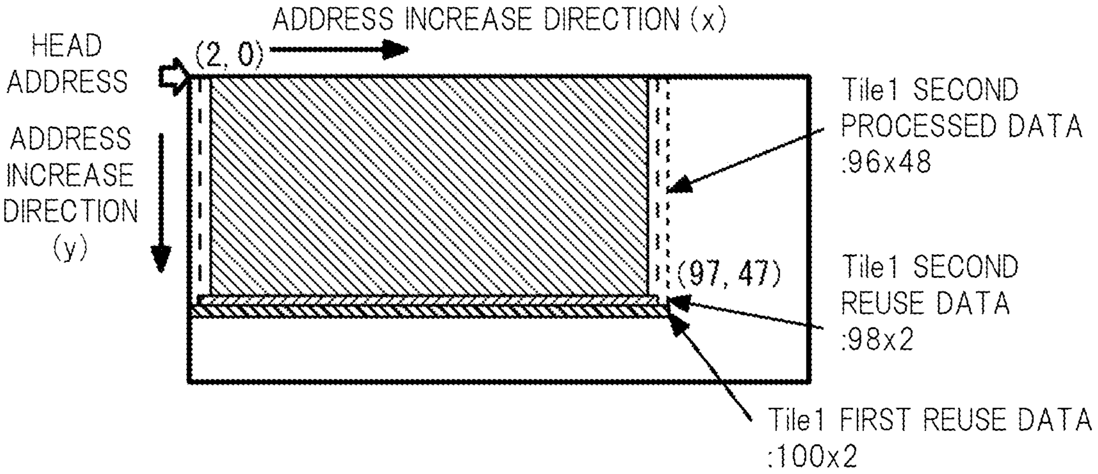
FIG. 5 is a diagram showing a state in which second processed data obtained by performing a second convolution operation to the first division image is stored in the storage unit.

FIG. 5 shows a state in which the Tile 1 second processed data is stored in the storage unit 16. This state is called state (C). As shown in FIG. 5, the Tile 1 second processed data is stored in, for example, regions of (2, 0) to (97, 47) shifted upward in the y direction by one line from the same position ((2, 1) to (97, 48)) as the position of the Tile 1 first processed data before processing the Tile 1 second processed data.

Note that in the first embodiment, since the convolution processing is completed twice, the reuse data is not set in the Tile1 second processed data. However, if the processing is to be continued further, the same processes as the above processes can be repeated. For example, a storage region of processed data in the storage unit 16 can be set to a region shifted upward in the y direction by one line from a storage region of unprocessed data.

Thereafter, the data transfer unit 15 writes the Tile 1 second processed data stored in the storage unit 16 to a head 96×48 portion of the region of the external memory 20 that stores the output image. Thus, the processing for the Tile1 is completed.

Processing Tile2

After storing the processing result of Tile1 in the external memory 20, a processing of Tile2 is performed. In processes of the second and subsequent Tiles, when data is stored in the storage unit 16, it is necessary to couple it with the already saved reuse data. Therefore, the memory management unit 3 allocates a region, which stores the data to be processed in the storage unit 16, from an address adjacent to a lower end of the corresponding reuse data.

Tile2 data to be read from the external memory 20 into the storage unit 16 will be considered. The storage unit 16 has already stored the Tile 1 first reuse data, which is a reuse portion of the loaded input image data, and the Tile 1 second reuse data, which is a reuse portion of the processing result. Therefore, in the first convolution processing of the Tile2, an input of 100×48 Tile2 data is required, and 100×50 image data obtained by adding the Tile1 first reuse data to this data becomes a target to be processed. The convolution processing is performed to this 100×50 image data, and 98×48 Tile 2 first processed data is generated.

In the second convolution processing of the Tile2, 98×50 image data obtained by adding 98×2 Tile1 second processed data to 98×48 Tile2 first processed data becomes a target to be processed. The convolution processing is performed to this 98×50 image data, and 96×48 second processed data is generated.

The image division unit 1 refers to a division method of the input image data as described above, and determines to read the 100×48 Tile 2 data that is coupled with the 100×2 first reuse data. The memory management unit 3 allocates, in the storage unit 16, a region for storing this Tile2 data. As described above, the storage unit 16 has a two-dimensional storage region of 64 lines with a width of 128 pixels, and can store the data in a wraparound format. For this reason, the memory management unit 3 allocates, as upper 100×12 storage destination of the Tile2 data, 12 lines of (0, 52) to (99, 63) adjacent to a lower end of (0, 50) to (99, 51).

In addition, the memory management unit 3 allocates, as a lower 100×36 storage destination of the Tile 2 data, 36 lines of head (0, 0) to (99, 35) of the storage unit 16. In this way, regions of 48 lines and 100×48 pixels across two locations, the lower end and the upper end of the storage unit 16 become storage destinations of the Tile 2 data. Note that the data transfer unit 15 can wrap around those two regions divided into the lower end and the upper end of the storage unit 16, and access them as one continuous region.

Figure 6:
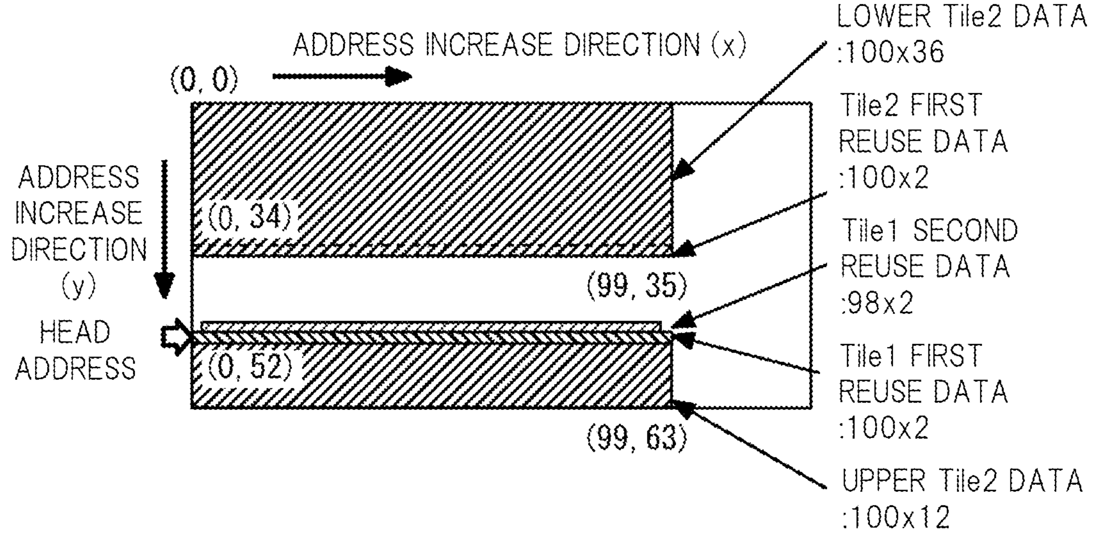
FIG. 6 is a diagram showing a state in which a second division image obtained by dividing the input image into three is loaded into the storage unit.

Furthermore, the memory management unit 3 marks data for last 100×2 pixels as Tile 2 first reuse data. That is, the memory management unit 3 sets the data stored in regions of (0, 34) to (99, 35) of the storage unit 16 as Tile 2 first reuse data. The transfer condition determination unit 14 determines a transfer condition(s) so that the Tile 2 data is stored in the region of the storage unit 16 allocated by the memory management unit 3. Based on this transfer condition, the data transfer unit 15 reads the Tile2 data from the external memory 20, and stores it in the region allocated on the storage unit 16. FIG. 6 shows a state in which the Tile2 data is loaded into the storage unit 16. This state is called state (D). In state (D), the Tile 2 first reuse data is indicated by a broken line frame.

Then, the arithmetic processing unit 17 reads the Tile2 data from the storage unit 16 by using the data transfer unit 15, performs an operation(s) necessary for the first convolution processing using the 3×3 kernel, and generates the Tile2 first processed data. The memory management unit 3 allocates, in the storage unit 16, a region for storing the Tile 2 first processed data. In the subsequent second convolution processing of the Tile 2, the Tile 1 second reuse data from (1, 48) to (98, 49) of the storage unit 16 is used. Therefore, the memory management unit 3 allocates the storage region for the Tile 2 first processed data to 14 lines of (1, 50) to (98, 63) adjacent to the lower end of the storage region for the Tile 1 second reuse data of the storage unit 16 and to 34 lines of (1, 0) to (98, 33) of the head line, that is, to 48 lines in total.

Furthermore, the memory management unit 3 marks, Tile 2 second reuse data, the data for last 98×2 pixels of the Tile 2 first processed data. That is, the memory management unit 3 sets the data stored in the regions of (1, 32) to (98, 33) of the storage unit 16 as Tile 2 second reuse data.

Figure 7:
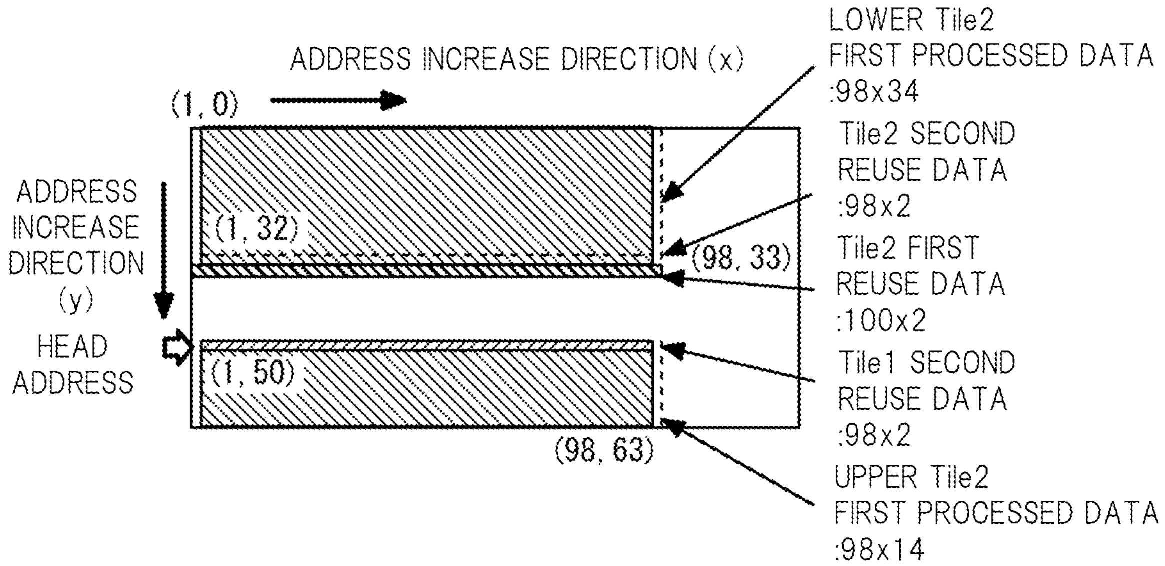
FIG. 7 is a diagram showing a state in which the first processed data obtained by performing the first convolution operation to a second division image is stored in the storage unit.

The transfer condition determination unit 14 determines a transfer condition(s) so that the Tile 2 first processed data is stored in the region of the storage unit 16 allocated by the memory management unit 3. The data transfer unit 15 stores the Tile 2 first processed data in the region allocated on the storage unit 16 based on this transfer condition. FIG. 7 shows a state in which the Tile 2 first processed data is stored in the storage unit 16. This state is called state (E). In state (E), the Tile2 second reuse data is indicated by a broken line frame.

Thereafter, the arithmetic processing unit 17 uses the data transfer unit 15 to read the Tile2 first processed data from the storage unit 16, performs an operation(s) necessary for the second convolution processing using the 3×3 kernel, and generate Tile2 second processed data. The memory management unit 3 allocates, in the storage unit 16, a region for storing the Tile2 second processed data. The Tile 1 second processed data can be stored, in the storage unit 16, in a region other than the region in which the Tile 2 first reuse data and the Tile 2 second reuse data are stored. Further, it is preferable that at least a part of the Tile 2 second processed data is overwritten and stored in the region in which the Tile 2 first processed data is stored.

The transfer condition determination unit 14 determines transfer conditions so that the Tile 2 second processed data is stored in the region of the storage unit 16 allocated by the memory management unit 3. The data transfer unit 15 stores the Tile 2 second processed data in the region allocated on the storage unit 16 based on this transfer condition.

Figure 8:
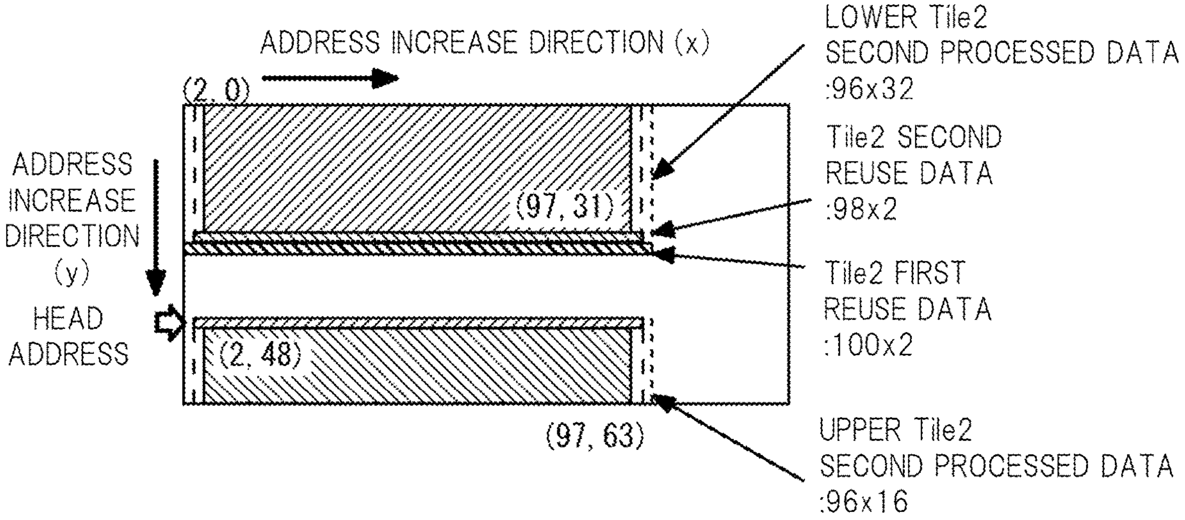
FIG. 8 is a diagram showing a state in which second processed data obtained by performing the second convolution operation to the second division image is stored in the storage unit.

FIG. 8 shows a state in which the Tile2 second processed data is stored in the storage unit 16. This state is called state (F). As shown in FIG. 8, the Tile2 second processed data can be stored in, for example, 16 lines of (2, 48) to (97, 63) and 32 lines of a head line (2, 0) to (97, 31) of the storage unit 16, that is, in 48 lines in total and in a 96×48 region. Note that, as described above, in the first embodiment, since those processes are completed by the two pieces of convolution processing, the reuse data is not set in the Tile2 second processed data.

Thereafter, the data transfer unit 15 writes the Tile2 second processed data stored in the storage unit 16 to an intermediate 96×48 portion of a region for storing the output image of the external memory 20. Thus, the processing for the Tile2 is completed.

Processing of Tile3

A description of a processing (s) of Tile3 will be omitted since it is the same as the processing of the Tile2 except for a point of not setting the reuse data. Note that the data transfer unit 15 writes Tile 3 second processed data stored in the storage unit 16 to a terminal 96×48 portion of the region for storing the output image in the external memory 20. Consequently, when an image is divided into three and the convolution processing is repeated twice, it is possible to obtain a final output image of the same size as the size when the image is processed without being divided.

Here, the number of pieces of convolution processing and a data load amount will be described when the input image size is X×Y and is divided into N tiles in the Y direction and the convolution processing using a 3×3 kernel is repeated C times.

When data is not reused, the number of times Z of the necessary convolution processing required is expressed by the following equation (1).

[Math 1]

$$Z = \sum_{t=1}^{c}(X - 2\times t)\times(Y - 2\times t) + (N - 1)\times\sum_{t=1}^{c}(X - 2\times t)\times(C - t) \tag{1}$$

Furthermore, a data load amount L at this time is expressed by the following equation (2).

$$L = X \times (Y + 2 \times C) \quad (2)$$

Meanwhile, in a case of the embodiment in which the data is reused, the number of times Z of the necessary convolution processings is expressed by the following equation (3).

[Math 2]

$$Z = \sum_{t=1}^{c} (X - 2 \times t) \times (Y - 2 \times t) \quad (2)$$

Furthermore, the data load amount L at this time is expressed by the following equation (4).

$$L = X \times Y \quad (4)$$

For example, when dividing 100×100 image data into two and performing the convolution processing using a 3×3 kernel five times, in the image processing device according to the first embodiment, the number of pixels loaded into the built-in memory is reduced by about 9.1% and the number of the convolution operations is reduced by 4.1% in comparison with a case of not using the reuse data.

As described above, according to the first embodiment, when the input image is divided into adjacent first and second division images and they sequentially stored in the built-in memory and the image processings thereto are performed, the data loaded during the processing of the first division image and the data generated by the image processing can be left in the built-in memory in ending the processing of the first division image and being transferred to the processing of the second division image. When loading the second division image into the built-in memory or performing the image processing repeatedly performed, the data is stored so as to be adjacent to the data left on the built-in memory, thereby making it possible to process the data as a series of pieces of image data including this region without reread from the outside or recalculation.

In this way, by devising the arrangement of the data into the storage unit 16, the data on the storage unit 16 can be reused, and the number of times of reading the image data from the other and the number of times of the calculation can be reduced, so that improvement in the processing performance of the CNN accelerator and a reduction in power consumption become possible.

Note that the first and second arithmetic processings for the input image data may include an operation(s) that does not refer to surrounding pixels and does not involve a reduction of the output image. In the operation that do not involve the reduction of the output image, the output image data can be written into the region, in which the input image data to be processed in the storage unit 16 is stored, without setting the reuse data.

Second Embodiment

Figure 9:
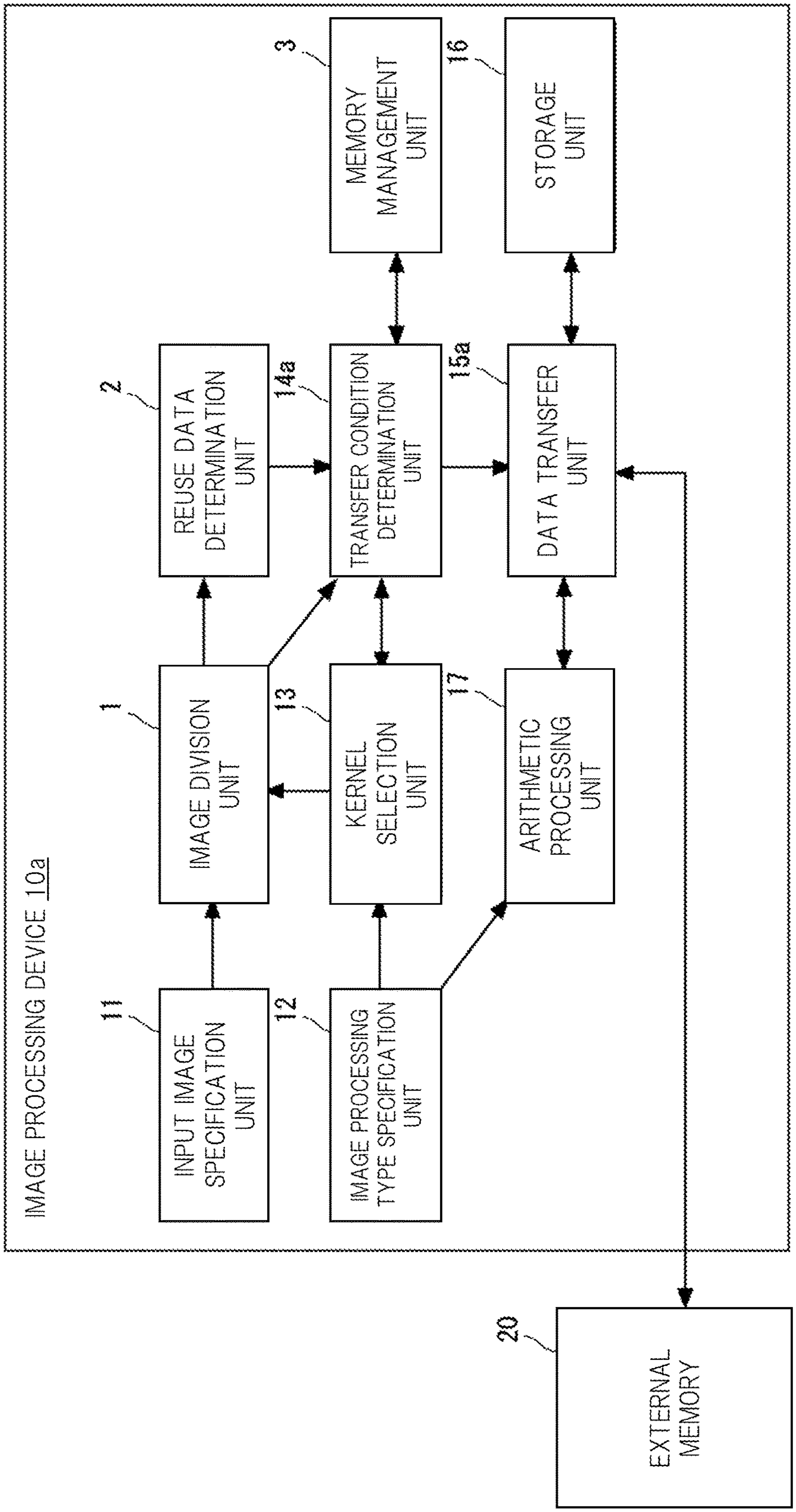
FIG. 9 is a diagram showing a configuration example of an image processing device according to a second embodiment.
Figure 10:
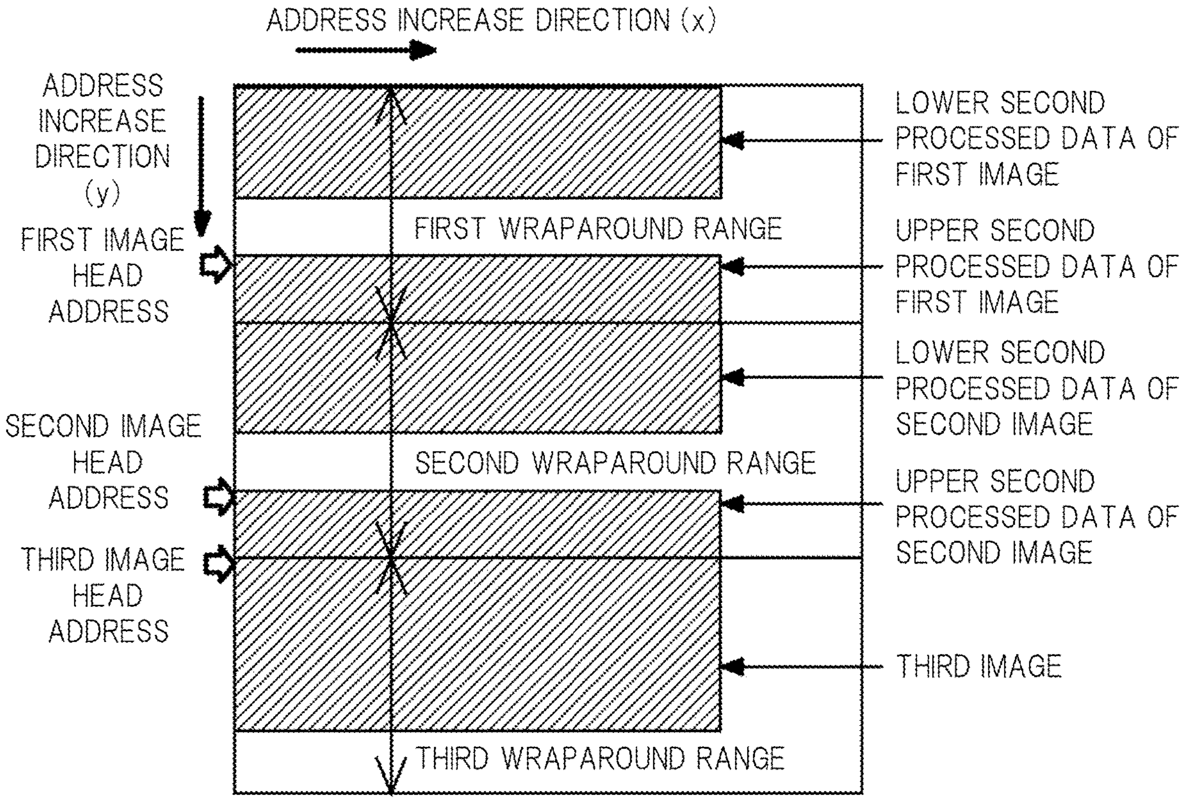
FIG. 10 is a diagram showing one example of an image processing method according to the second embodiment.

An image processing device 10*a* according to a second embodiment will be described with reference to FIGS. 9 and 10. FIG. 9 is a block diagram showing a configuration example of the image processing device according to the second embodiment. FIG. 10 is a diagram showing one example of an image processing method according to the second embodiment. The second embodiment differs from the first embodiment in that a plurality of wraparound ranges can be set in the storage unit 16.

In the second embodiment, the data transfer unit 15 shown in FIG. 1 according to the first embodiment is changed to the data transfer unit 15*a* performing the data transfer so as to store respective different pieces of data in a wraparound method in a plurality of wraparound ranges set by the storage unit 16. Consequently, a region, in which the data in the storage is stored unit 16, can be divided into a plurality of wraparound ranges not overlapping with each other. Note that, in addition to a function of determining the transfer conditions described above, the transfer condition determination unit 14*a* may have an additional function of determining the wraparound range in which each piece of data is stored.

In the following description, it is assumed that the inputted image data includes first image data and second image data that are different from each other. For each of the first image and the second image, the following processings are performed: a processing of dividing them into a plurality of pieces of division image data, a processing of determining reuse data, and a processing of allocating a region storing the division image data of a target(s) to be processed of subsequent processings so as to be adjacent to the region storing the reuse data. For example, the first image and the second image can each be divided into three, that is, into Tile1, Tile2, and Tile3, and be processed in the same manner as in the first embodiment. In the second embodiment, processing results obtained by performing the convolution processing to each of the first image data and the second image data is further mutually operated, and an operation result is generated.

In such a case, in the image processing device 10 of the first embodiment, the wraparound range is fixed, so that while the processing result of the first image data is stored in a part of the storage unit 16, a series of convolution processings repeatedly performed to the second image data cannot be performed. In this case, once the convolution processing results of the first image data and the second image data are outputted to the external memory 20, they require to be read again in performing an inter-image operation (s).

In contrast, in the second embodiment, the inter-image operation can be efficiently performed without inputting/outputting the convolution processing result of the first image data and the second image data to/from the external memory 20. FIG. 10 shows an example of a state of the memory unit 16 after performing the convolution processing twice to each of two input images (first image, second image) and in comparing the processing results to each other pixel by pixel.

An example shown in FIG. 10 shows a state in which the processing results of the Tiles 2 of the first image and the second image are stored in first and second wraparound ranges of the storage unit 16, respectively. That is, the Tile 2 second processed data of the first image is stored in the first wraparound range, and the Tile 2 second processed data of the second image is stored in the second wraparound range. The Tile 2 second processed data of the first image is the output image of the Tile2 of the first image, and the Tile 2 second processed data of the second image is the output image of the Tile 2 of the second image.

The first and second wraparound ranges each correspond to the state of the storage unit 16 in FIG. 8 of the first embodiment. Note that in FIG. 10, the description of the first reuse data and the second reuse data of the Tile 2 is omitted. In this way, by being able to set the different wraparound ranges for the first image and the second image in the storage unit 16, the processings of the first image and the second image can be performed without affecting each other.

Furthermore, in the example shown in FIG. 10, the operation results obtained by comparing the Tile 2 second processed data of each of the first image and the second image can may be stored in a third wraparound range. Specifically, the arithmetic processing unit 17 uses the data transfer unit 15*a* to read the Tile 2 second processed data of the first image from the first wraparound range of the storage unit 16, and read the Tile 2 second processed data of the second image from the second wraparound range, thereby being able to perform a comparison processing by using them. Furthermore, the data transfer unit 15*a* can store a third image, which is the operation result of the inter-image comparison, in the third wraparound range. For example, in a driving support system, a first image and a second image that are sequentially acquired over time are compared, and a third image that indicates movement of the same object recognized in the first image and the second image may be generated. The second embodiment is applicable to such an example.

Furthermore, after storing the third image in the third wraparound range, it is possible to use the reuse data (not shown) regarding each of the first image and the second image to perform the convolution processing to the Tile3.

Although the invention made by the present inventors has been specifically explained based on the embodiments above, the present invention is not limited to the embodiments already described and, needless to say, can variously modified without departing from the scope of the invention.

The program described above includes an instruction group (or software code) that, when loaded into the computer, causes the computer to perform one or more of the functions described in the embodiments. The program may be stored in a non-transitory computer readable medium or a tangible storage medium. As not the limit but the example, the computer readable medium or the tangible storage medium includes random-access memory (RAM), read-only memory (ROM), flash memory, solid-state drive (SSD) or other memory techniques, CD ROM, DVD (Digital Versatile Disc), Blu-ray Disc or other optical disc storages, magnetic cassette, magnetic tape, magnetic disc storage or other magnetic storage devices. The program may be transmitted on the transitory computer-readable medium or the communication medium. As not the limit but the example, the transitory computer-readable or the communication media includes electrical, optical, acoustic, or other forms of the propagation signals.

What is claimed is:

1. A non-transitory computer readable medium that stores a program causing a computer to perform an image processing method comprising:

dividing input image data into a plurality of pieces of division image data including first division image data and second division image data having a predetermined overlap region with the first division image data according to a size of a kernel used for image processing;

determining first reuse data to be reused in performing the image processing to the second division image data among the first division image data;

in a memory, storing first processed data of a first division image, which is obtained by performing the image processing to the first division image data, in a region other than a region storing the first reuse data, and allocating a region storing the second division image data so as to be adjacent to the region storing the first reuse data;

determining, among the first processed data of the first division image, second reuse data reused when performing the image processing to the second division image data to generate first processed data of a second division image; and in the memory, storing second processed data of the first division image obtained by performing the image processing to the first processed data of the first division image in a region other than the region storing the first reuse data and a region storing the second reuse data, and allocating a region storing the first processed data of the second division image so as to be adjacent to the region storing the second reuse data.

2. The non-transitory computer readable medium according to claim 1, the image processing method further comprising overwriting and storing at least a part of the first processed data of the first division image in a region storing the first division image data of the memory.

3. The non-transitory computer readable medium according to claim 1, the image processing method further comprising overwriting and storing at least a part of the first processed data of the second division image in a region storing the second division image data of the memory.

4. The non-transitory computer readable medium according to claim 1, wherein the second reuse data is used when the image processing is further performed to the first processed data of the second division image.

5. The non-transitory computer readable medium according to claim 1, the image processing method further comprising, in the memory in a wraparound method, storing the first division image data, data obtained by performing the image processing to the first division image data, the second division image data, and data obtained by performing the image processing to the second division image data.

6. A non-transitory computer readable medium that stores a program causing a computer to perform an image processing method comprising:

dividing input image data into a plurality of pieces of division image data including first division image data and second division image data having a predetermined overlap region with the first division image data according to a size of a kernel used for image processing;

determining first reuse data to be reused in performing the image processing to the second division image data among the first division image data; and in a memory, storing first processed data of a first division image, which is obtained by performing the image processing to the first division image data, in a region other than a region storing the first reuse data, and allocating a region storing the second division image data so as to be adjacent to the region storing the first reuse data, wherein the input image data comprises first image data and second image data, and wherein the image processing method further comprises:

dividing second image data in a plurality of pieces of division image data including third division image data and fourth division image data having a predetermined overlap region with the third division image data according to a size of a kernel used for image processing;

determining third reuse data to be reused in performing the image data to the fourth division image data among the third division image data;

in the memory, storing first proceeded data of a third division image, which is obtained by performing the image processing to the third division image data, in a region other than a region storing the third reuse data, and allocating a region storing the fourth division image data so as to be adjacent to the region storing the third reuse data;

storing, in a wraparound method, the first division image data, data obtained by performing the image processing to the first division image data, the second division image data, and data obtained by performing the image processing to the second division image data in a first wraparound range of the memory; and storing, in the wraparound method, the third division image data, data obtained by performing the image processing to the third division image data, the fourth division image data, and data obtained by performing the image processing to the fourth division image data in a second wraparound range different from the first wraparound range of the memory.

7. The non-transitory computer readable medium according to claim 6, the image processing method further comprising storing, in the wraparound method, output image data, which is generated by using the third division image data and the fourth division image data, in a third wraparound range different from the first wraparound range and the second wraparound range of the memory.

8. An image processing device comprising:

a processor; and a memory storing a program that, when executed by the processor, causes the processor to:

divide input image data into a plurality of pieces of division image data including first division image data and second division image data having a predetermined overlap region with the first division image data according to a size of a kernel used for image processing;

determine first reuse data to be reused in performing the image processing to the second division image data, among the first division image data; and store, in the memory, first processed data of a first division image, which is obtained by performing the image processing to the first division image data, in a region other than a region storing the first reuse data, and allocate a region storing the second division image data so as to be adjacent to the region storing the first reuse data, wherein the input image data comprises first image data, wherein the processor is configured to divide second image data into a plurality of pieces of division image data including third division image data and fourth division image data having a predetermined overlap region with the third division image data according to a size of a kernel used for image processing, wherein the processor is configured to determine the first reuse data to be reused in performing the image processing to the fourth division image data among the third division image data, wherein the processor is configured to, in the memory, store first processed data of a third division image, which is obtained by performing the image processing to the third division image data, in a region other than a region storing third reuse data, and to allocate a region storing the fourth division image data so as to be adjacent to the region storing the third reuse data, and wherein the processor is configured to:

store, in a wraparound method, the first division image data, data obtained by performing the image processing to the first division image data, the second division image data, and data obtained by performing the image processing to the second division image data in a first wraparound range of the memory; and store, in the wraparound method, the third division image data, data obtained by performing the image processing to the third division image data, the fourth division image data, and data obtained by performing the image processing to the fourth division image data in a second wraparound range different from the first wraparound range of the memory.

9. The image processing device according to claim 8, wherein the processor is configured to store, in the wraparound method, output image data, which is generated by using the third division image data and the fourth division image data, in a third wraparound range different from the first wraparound range and the second wraparound range of the memory.

* * * * *